US006859639B2

(12) United States Patent
Spratt et al.

(10) Patent No.: US 6,859,639 B2
(45) Date of Patent: Feb. 22, 2005

(54) MESSAGE DIFFUSION BETWEEN MOBILE DEVICES

(75) Inventors: Michael P. Spratt, Bristol (GB); Robert Francis Squibbs, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 549 days.

(21) Appl. No.: 09/798,738

(22) Filed: Mar. 2, 2001

(65) Prior Publication Data

US 2001/0021638 A1 Sep. 13, 2001

(30) Foreign Application Priority Data

Mar. 11, 2000 (GB) .............................................. 0005801
Mar. 20, 2000 (GB) .............................................. 0006587

(51) Int. Cl.[7] .......................... H04B 7/15; H04B 1/38; H04L 12/28; H04L 12/56
(52) U.S. Cl. ...................... 455/11.1; 455/67.1; 370/390
(58) Field of Search ............................. 455/11.1, 67.1; 370/390

(56) References Cited

U.S. PATENT DOCUMENTS

| 4,284,848 A | * | 8/1981 | Frost |
| 4,639,937 A | | 1/1987 | McRae et al. ................ 375/40 |
| 5,481,532 A | | 1/1996 | Hassan et al. ................ 370/16 |
| 5,740,363 A | | 4/1998 | Siep et al. ............. 395/200.3 |
| 5,790,952 A | | 8/1998 | Seazholtz et al. ........... 455/432 |
| 5,875,400 A | | 2/1999 | Madhavapeddy et al. ... 455/458 |
| 6,055,429 A | | 4/2000 | Lynch ........................ 455/445 |
| 6,493,545 B1 | | 12/2002 | Sugaya ....................... 455/272 |
| 6,584,080 B1 | | 6/2003 | Ganz et al. ................. 370/315 |
| 2001/0021638 A1 | * | 9/2001 | Spratt et al. ............... 455/11.1 |
| 2001/0021654 A1 | * | 9/2001 | Spratt et al. ............... 455/67.1 |
| 2001/0026552 A1 | * | 10/2001 | Spratt et al. ............... 370/390 |
| 2001/0039181 A1 | * | 11/2001 | Spratt ........................ 455/11.1 |
| 2003/0037033 A1 | | 2/2003 | Nyman et al. ................ 707/1 |

FOREIGN PATENT DOCUMENTS

| DE | 19535021 | | 7/1997 |
| EP | 0461279 B1 | | 4/1995 |
| EP | 0526388 B1 | | 6/1997 |
| EP | 0913965 A1 | | 5/1999 |
| EP | 0948222 A2 | | 10/1999 |
| EP | 1133113 | * | 9/2001 |
| EP | 1133116 | * | 9/2001 |
| GB | 2344723 A | | 6/2000 |
| JP | 9191495 | | 7/1997 |
| JP | 09252277 | | 9/1997 |
| WO | WO 96/19887 | | 6/1996 |

OTHER PUBLICATIONS

Dettmer, "Digital Short range Radio", IEEE Review, Jul. 1989, pp. 243–245.*

* cited by examiner

Primary Examiner—William D. Cumming (57) ABSTRACT

Information with local relevance is diffused locally using mobile devices (10) equipped with non-wired short-range communication means, the information being propagated from an originating point (12) in messages passed from device to device in an unstructured way. To encourage users of the mobile devices (10) to participate in the propagation method, the presentation of a message received at a device to the device user is inhibited unless the device is enabled to propagate on the message.

13 Claims, 5 Drawing Sheets

MESSAGE DIFFUSION BETWEEN MOBILE DEVICES

FIELD OF THE INVENTION

The present invention relates to the local diffusion of information, particularly information of local relevance, using mobile devices.

BACKGROUND OF THE INVENTION

Mobile devices with communications capability are becoming ubiquitous, the most common being the cell phone and other devices employing cellular radio technology. Many services are being implemented using such devices and many more may be expected as information regarding the location or position of the mobile device becomes readily available through the implementation of location discovery within the mobile radio infrastructure.

One type of service that is emerging is the distribution of local information which is relevant only to a particular narrow geographic location and need only be communicated to people within that location. Such information is usually distributed as a result of a request generated from a mobile device, the request either including the device's location or authorizing the obtaining of the device's location from a location server of the mobile radio infrastructure. The locally-relevant information can also be pushed over the mobile radio infrastructure to mobile devices within a given locality, though the costs of doing so are high. The type of information which it is most desirable to be able to push is information with a certain immediacy to it either because the information will go out of date quickly or because the target audience is transitory. One example is where a theatre still has seats available for a show shortly starting, and would like to offer the seats at half price. Another example is information about consumer goods (particularly new products or products under special promotion) which a shop wishes to advertise to consumers passing by.

In view of the cost and complexity of using mobile radio networks to push information, it would be useful to have a different way of distributing local information which has immediacy to it.

It may also be noted that although, as indicted above, location information will become increasingly available, this will only be to users of certain types of devices (cellular radio devices, GPS-equipped devices). Other devices will not have the appropriate capability to directly access location information and will therefore not be able to benefit from the full range of location-based services. Even if a device does have access to location discovery technology, the level of accuracy may deteriorate in the prevailing conditions (receivability of base stations and satellites, interference from buildings etc.) reducing the effectiveness of location based services. In both the foregoing cases it would be desirable for accurate location information to be locally distributed (but only over a short distance so as not to unacceptably affect its accuracy).

A number of technologies exist for the short range communication of information between mobile devices. These technologies include infra-red based technologies and low-power radio technologies (including, in particular, the recent "Bluetooth" short range wireless standard). Depending on the technology implementation, differing types of message propagation will be enabled including asynchronous message broadcast, and multicast and point-to-point duplex connections established after coordination and negotiation between communicating devices.

Temporary networks using collections of mobile devices are of current interest. In particular, the Ad Hoc Networks Working Group of the IETF (Internet Engineering Task Force) is looking at the situation where two devices can temporarily communicate for a short time, via intermediate mobile devices; in this case, there is assumed to be some sort of temporary connectivity between the two devices across a short-lived mobile network. This work is primarily aimed at scenarios such as people in a conference environment sending mail to one another via intermediate devices, a situation which is dynamic, but which will tend to be temporarily static. Another example of an Ad Hoc network is the connection of ships or tanks in a military situation, where the topology of the network is evolving, but gradually over a period of time.

It is an object of the present invention to facilitate the local diffusion of information.

SUMMARY OF THE INVENTION

According to one aspect of the present invention, there is provided a method of locally diffusing information for presentation to users of mobile devices, the method involving propagating the information from an originating point in messages passed from device to device by non-wired short-range communication means of the devices, presentation of a message received at a device to a user of the device being inhibited unless the device is enabled to propagate on the message.

According to another aspect of the present invention, there is provided a mobile device for locally diffusing information in messages to other devices for presentation to their users, the mobile device comprising:
  a message store;
  a short-range wireless transceiver for receiving messages and storing them to said store, and for transmitting messages retrieved from the store;
  a user interface for presenting received messages to the device user;
  a controller for controlling onward transmission of received messages and operative, at least in respect of certain received messages, to inhibit presentation of a received message to the user unless the device is enabled to transmit on the message.

BRIEF DESCRIPTION OF THE DRAWINGS

A method and mobile device, both embodying the present invention, for locally diffusing information will now be described, by way of non-limiting example, with reference to the accompanying diagrammatic drawings, in which.

BEST MODE OF CARRYING OUT THE INVENTION

Figure 1:
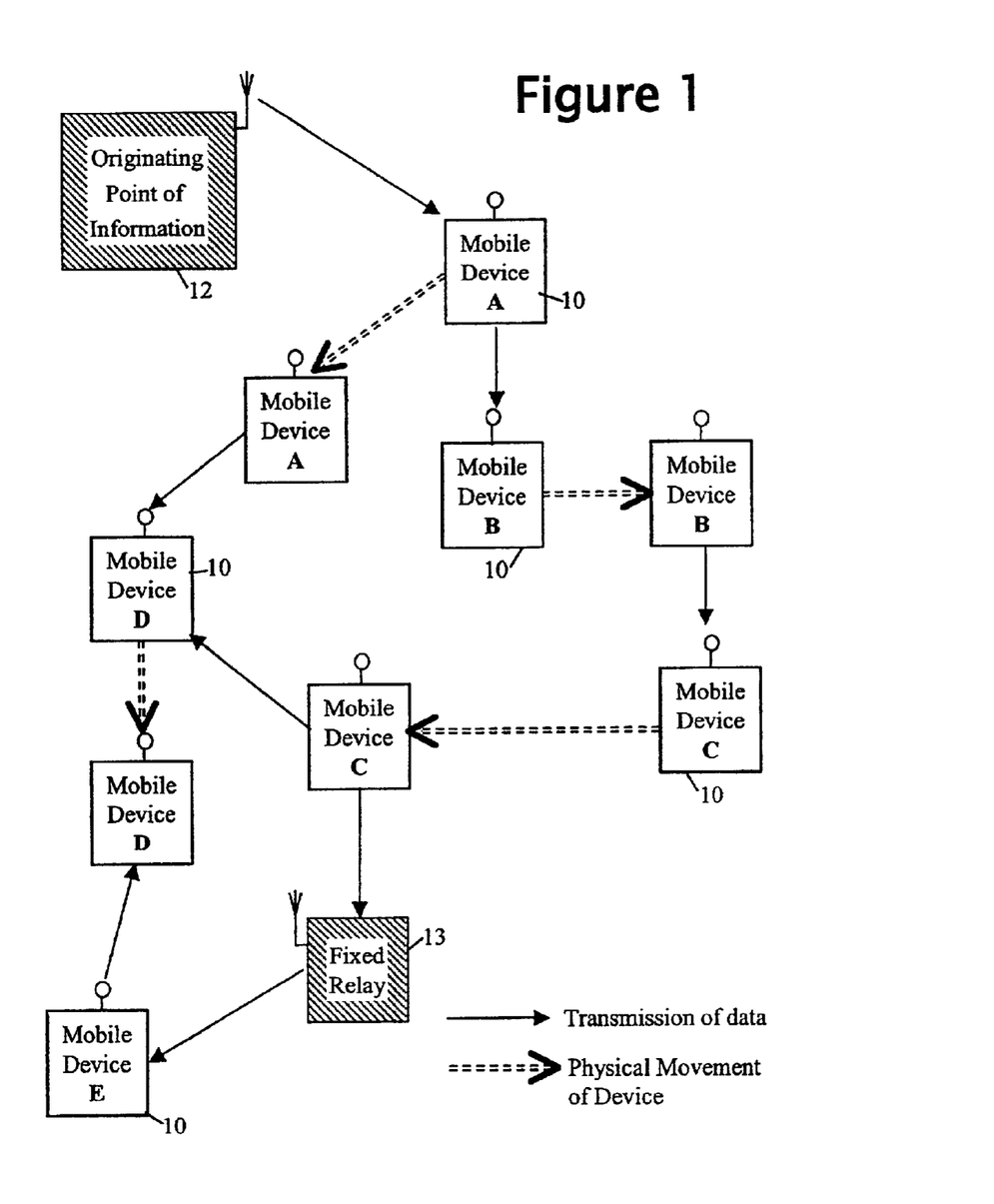
FIG. 1 is a diagram illustrating the propagation of an information-bearing message in accordance with the information-diffusion method embodying the invention.
Figure 2:
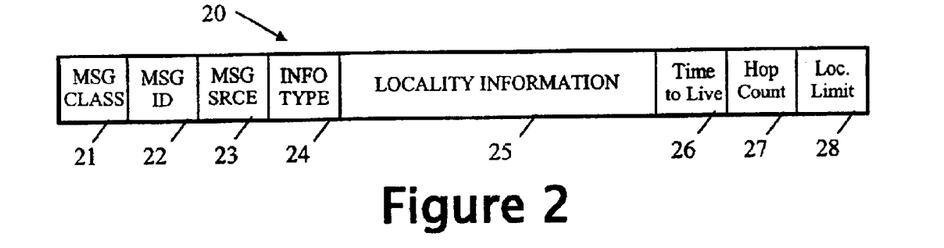
FIG. 2 is a diagram showing the format of the information-bearing message being propagated in FIG. 1.

FIG. 1 illustrates the general operation of an embodiment of the invention. This embodiment involves a plurality of mobile devices 10 each equipped with the same type of non-wired short-range communication means, such as an IR or BLUETOOTH® radio system. The mobile devices are individually labelled A to E and may be carried by pedestrians and/or cycles, vehicles or other means of transport. Also shown in FIG. 2 is an originating point (source) 12, and a static relay station 13, both of which are equipped with the same type of short range communication means as the mobile devices 10. The actual form of the short-range communications technology employed by the devices 10, originating point 12, and relay station 13, is not critical to the present invention and any suitable technology can be used together with any appropriate propagation regime (broadcast, multicast, repeated one-to-one, etc.

In operation, originating point 12 sends out information intended for the users of the mobile devices, by including the information in a message which it then transmits one or more times via its short-range communications means. The message is picked up by an adjacent device and then propagated on to other devices thereby diffusing the information over the community of devices 10 for presentation to the users.

More particularly, in the illustrated example, device A picks up the message transmitted by originating source 12 and propagates it on to device B using the short-range communications means of the two devices. Device B then moves position before propagating on the message to device C. Device C now also moves before propagating the message both to device D and to the fixed relay station 13. At around the same time as receiving the message from device C, device D receives the message from device A, the latter having moved from its starting position. Device D then moves position and receives the message again, this time from a device E that received the message from the relay station 13. Although device D has ended up receiving the message three times, this is not a problem since the message carries a message ID that is present in all copies of the same message, thereby enabling a recipient device (here, device D) to recognise that it has received multiple copies of the same message.

As can be seen, in the illustrated example, message diffusion is, in part, due to the movement of the devices since although the actual transfer of a message from one device to another is due to transmission using the short-range communications means, devices may only be brought into range as a result of the movement of one or other of the devices.

The propagation of the message from device to device is effected in an unstructured way in the sense that the messages are not routed in any particular way and there is no target final destination specified; instead, the message diffusion relies on the involvement of whatever devices are conveniently available and enabled to participate in the process.

The originating point need not be fixed in position, being, for example, a mobile device similar to devices 10. Furthermore, message diffusion does not require the involvement of a relay station 13 though such stations may be useful in extending the range of message diffusion.

The device inter-connectivity required by the above process need only be of a highly transitory nature, it not even being necessary for the devices to connect long enough for the message-receiving device to send a reply (in other words, unacknowledged message transfer is operationally adequate). This characteristic enables moving devices to be more easily utilised before they are out of range. This highly transient nature of device inter-connectivity contrasts with the type of network being considered by the Ad Hoc Networks Working Group of the IETF (see above), where the objective is primarily to establish, albeit temporarily, a temporary connection between endpoints.

With respect to the type of information included in a message, this will generally be locality information, that is:

information with at least an item that is explicitly or implicitly of local relevance, such as commercial advertising and promotional information relevant to a local retail outlet (the information may even include an electronic voucher that the user of a recipient device can present to the retail outlet to receive a discount or other reward) —in such cases the originating point will generally be at or adjacent the retail outlet concerned; and/or the position of the originating point (whereby to enable devices not equipped with location discovery means to ascertain their location indirectly, this position information then being provided, for example, to a location-aware service using the short-range communications means of the device or, possibly, a cellular radio capability possessed by the device. Position may be specified in any appropriate way such as longitude and latitude, local grid coordinates, names of local places, etc.

The information need not be restricted to visually displayable information and can take the form of short audio advertisements or low bit-rate music clips to consumers within a particular vicinity, for example to advertise products within a record/CD/music kiosk type of shop within a shopping mall.

Restriction Mechanisms

In order to ensure that all devices in the area around an originating point have the opportunity of receiving a message, propagating devices are preferably configured to seek to multiply the number of message copies in circulation, either by sending a message multiple times and/or by sending the message to multiple other devices. For example, a device can be configured to send on a message immediately it is received and then at timed intervals thereafter, and/or upon detecting another device close by. In this way, an initial build up of the number of active message copies can be achieved provided there are sufficient devices in the area.

However, the unrestricted propagation of messages is generally undesirable as it can result in information continuing to circulate after it has become out-of-date, and being propagated into areas where it is not relevant; also, device and bandwidth resources will be unnecessarily consumed. What is required is that after an initial build up of the number of active message copies, this number should die away. To achieve this, several different restriction mechanisms are preferably employed in the mobile devices 10. Suitable restriction mechanisms are described below and particular implementations are then given with reference to the FIG. 3 embodiment of mobile device 10. The restriction mechanisms can be employed individually or selected combinations in order to achieve desired restriction characteristics.

Message life control mechanisms—the life of a message can be restricted in a number of ways, for example by using:

- a time-to-live limit set on a message as sent from the originating point;
- a hop limit set on the number of times the message from the originating point can be propagated along a chain of propagation;
- a locale limit outside of which the information should not to be propagated.

These limits generally involve the inclusion of propagation limitation data in each propagated message copy, with each receiving device examining this data to determine whether it should treat the message as no longer alive (that is, no longer one which should be considered for propagation).

With respect to the time-to-live limit, this can be implemented by specifying a time value (such as 10 minutes) in the message as sent by the originating point. At each device the message transits, this time value set in the message is decreased by an amount corresponding to the time the message has been held in the device. A receiving device can then determine whether a received message has exceeded its initial lifetime by examining the time value in the message and determining whether the message has been held for longer than that time—if it has, the message is treated as no longer alive or active (that is, dead) and is therefore not propagated further. This way of determining lifespan has the advantage that the clocks of the different devices do not need to be in sync with each other (if, in fact, this could be guaranteed, then, of course, it would only be necessary for the originating point to specify an absolute time of death for the message).

With respect to the hop count limit, this is initially set to some value by the originating point and each time a message copy is propagated, the hop count value in the message is decremented before sending (conveniently, the hop count of a message can be decremented immediately the message is received by a device); if a receiving device receives a message with a zero hop count value (or, alternatively, if the hop count becomes zero when decremented by the device), it treats the message as no longer alive for the purposes of propagation. It would also be possible to start with a zero count and increment it at each hop, the message copy being treated as inactive when the count reaches a specific value set by the device.

Setting a locale limit requires that the devices can find out their current position. This they may be able to do via some location discovery means (GPS system; location server of mobile radio infrastructure) to which they have access, or via information received over their short-range communication means. This latter case could be implemented by arranging for messages transmitted by originating points to include position data of the originating points, the receiving device then determining its position by considering the position data contained in a set of the messages most recently received by the device. Thus, the most prominent (that is, frequently occurring) originating-point position in the set could be taken as the device's position, it being appreciated that taking the position data of the most recently received message as representing the position of the device is unsound where there are more than one originating points in the vicinity. The set of messages used is conveniently defined by a time window though it would also be possible to use a set of the last N messages. Rather than taking the position of the most prominent originating point for the device's position, a weighted average could be used to estimate an intermediate position between originating points; for example, if 80% of messages received came from a first originating point and 20% from a second originating point, the X coordinates of these two points could be combined in an 80:20 weighting ratio to give the X coordinate of the receiving device with a similar calculation being effected to for the Y coordinate.

The foregoing method of determining position by looking at position data in a set of most recently received messages can, of course, be employed independently of using the position information for restricting propagation—for example, the position of the device determined in this way can be used as input to a location aware service or simply presented to the device user.

In fact, it is possible to generate a boundary beyond which a message is not to be propagated, without the need to include specific locale limit data in the message. This involves detecting when the percentage of messages coming from the same originating point as the message under consideration has fallen below a threshold percentage that effectively defines a "boundary" to the zone of influence of the originating point—if the current percentage is below the threshold, the message of interest is not propagate. This mechanism is described in more detailed below with reference to FIG. 7.

Device-set propagation limits—the involvement of each device in message propagation can be constrained by one or more of the following:

- discarding without propagation subsequently received copies of a message previously received;
- limiting the number of times the device can transmit on the message;
- increasing the gap between re-transmissions of the message in dependence on how many times the message has been received by the device.

This latter restriction mechanism works on the basis that if a large number of copies of a message are being received, then the device can reasonable infer that the message is circulating adequately without further copies being propagated at that time—in other words, the inter-sending gap should be increased. On the other hand, if no subsequent copies are received, this can be interpreted as an indication that the user has moved to an area where none of the nearby devices have any knowledge of the message, so the message should be repeated by the device somewhat more often, that is, the inter-sending gap should not be increased. In the extreme, if more than a threshold number of copies of a message are received, further propagation can be terminated (send gap set to infinity). Rather than adjusting the send gap simply in dependence on the total number of copies received of the same message, the send gap could be adjusted in dependence on the number of copies received in a sliding time window or in dependence on some other measure of the current rate of receipt of message copies.

User Control—A more general form of propagation restriction can be exercised by the user specifying the types of message in which they have an interest and only accepting messages of those types, messages of other types being simply rejected without onward propagation. This filtering of the messages handled and propagated by a device can be effected according to at least one of:

- the source of the message as indicated by a source identifier contained in the message (if required, authentication mechanisms can be used to confirm the source identity);
- the type of information contained in the message as indicated by an information-type data item in the message.

Of course, the user of a device, whilst still wishing to receive messages, may not want his/her device to be used at all in message propagation and the device can be provided with means for enabling the user to completely deactivate message propagation. However, this is probably not desirable behaviour from the point of view of the party controlling the originating point as it interferes with the message propagation process whilst still benefiting the user. A way of requiring users to either participate fully or not at all is to arrange for the messages only to be viewable, or otherwise presentable, to a user if the message has been accepted for propagation. Since not all message originators may want to require such a regime of operation and since the device will normally be intended to receive other types of messages (not just those intended for propagation), it is convenient to append a message class designator to each message, this message class designator identifying:

- messages which must be accepted for onward propagation if the message is to be accessible to the user of a device (such messages are termed "propagation mandatory" or "PM" messages hereinafter);
- messages the onward propagation of which is optional, the messages being accessible to the device user whether or not the messages are accepted for propagation (such messages are termed "Propagation Optional" or "PO" messages hereinafter);
- one or more other classes of message (for example, an "emergency" message class for messages, such as a fire alert, or a request for a doctor, that must be propagated under all circumstances).

The devices 10 are then arranged to recognise the class of a message and operate accordingly. With respect to PO messages (propagation optional), the user determines by appropriate input to their device whether or not such messages are to be propagated. With respect to PM messages (propagation mandatory), the devices preferably permit a user to select whether to effect a general election of whether or not to accept such messages for propagation, or to effect such an election on a per message basis. In this later case, the user is presented with an indicator of the contents/origin of a message before making their election.

Device Embodiment of FIGS. 2 to 6

Turning now to the particular embodiment of the mobile device 10 shown in FIGS. 2 to 6, consideration is first given to the form of information message 20 intended to be propagated through the device, it being understood that the illustrated message field structure (see FIG. 2) is that of the message delivered by, and accepted by, the short-range communications means of a device 10. Message 20 comprises the following fields:

- Message class field 21—this field contains the class designator indicating whether the message is of class PM, PO or other;
- Message ID field 22—this field contains a unique identifier of a message, the identified being retained by each copy of the same message;
- Message source ID field 23—this field contains the ID of the originating point 12 (fields 22 and 23 can be combined);
- Information type field 24—this field contains an indication of the type of information carried by the message—for example, whether it is advertising (and if so, what general type of product or service is involved) or position data relating to the originating point;
- Information field 25—this field contains the information being propagated,—this will generally be locality information;
- Time-to-live field 26—this field contains the time-to-live value discussed above in relation to limiting message life;
- Hop count field 27—this field contains the hop count discussed above in relation to limiting message life—in this example, hop count is intended to be decremented to zero;
- Locale Limit field 28—this field contains the locale limit information discussed above in relation to limiting message propagation to a particular area.

Figure 3:
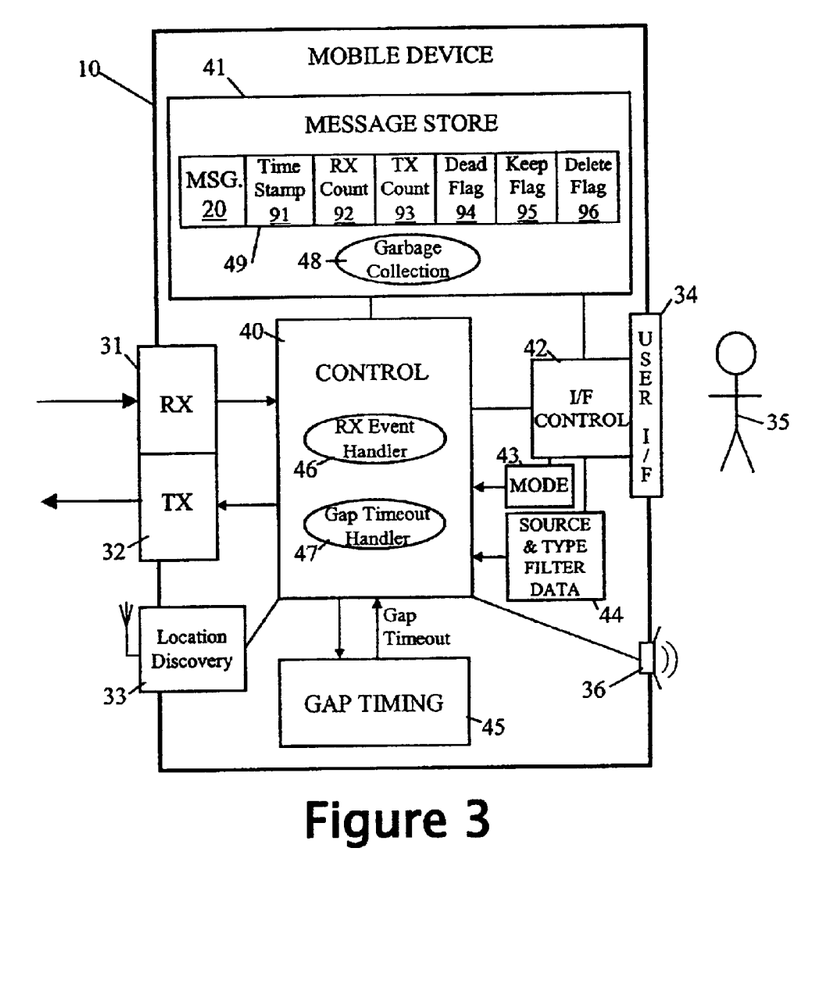
FIG. 3 is a diagram of a mobile device involved in message propagation in FIG. 1.

As shown in FIG. 3, the mobile device 10 comprises receive and transmit blocks 31 and 32 respectively that together form short-range communication means (for example infra-red or radio based), a control block 40, a message store 41, and user interface 34 (typically, a display and input keypad) controlled by user interface control 42. The control block 40 controls the handling of messages received through receive block 31, passing them to store 41 and user interface 34 as appropriate and initiating their onward propagation through transmit block 32 when required. The control block implements event handler processes 46 and 47. Event handler 46 is operative to respond to a message receipt event in respect of an PM (propagation mandatory) message as will be more fully described below; handler 46 also handles PO (propagation optional) in the case that the device user 35 has indicated that such messages are to be treated as PM messages (this user indication is input through interface and is stored in mode store 43). In addition to the PM message receipt handler 46, a second message receipt handler, not shown, is also provided for handling other messages not intended for propagation, including PO messages in the case that the user has indicated that such messages are not to be propagated; this second message handler is not described herein as it does not form part of the present invention and can, in any case, be simply implemented to present the received message to the user.

The event handler 47 services gap timeout events generated by a gap timing block 45, the latter being tasked by control block 40 to time the intervals between message resends. Handler 47 is responsible for deciding whether following a timeout, the message concened should actually be resent.

Mode store 43 as well as holding the user's choice in respect of how PO messages are to be handled, also stores user-set mode indicators as to whether PM messages are to be handled at all and, if so, whether they should be generically accepted for propagation or whether the user must give his/her consent on a per message basis.

A store 44 holds the user's choice as to what type of information are to be accepted and what sources are acceptable, this information being used by event handler 46. Other elements of device 10 are a location discovery block 33 (for example, a cellular radio unit by which the device may request its location from a location server of the mobile cellular radio infrastructure), and an audio alert device for alerting the user to the receipt of a new message.

Each incoming message that is not immediately discarded is stored in a corresponding message entry 49 in message store 41. As well as the message 20 itself, the message entry 49 holds the following items:

- Timestamp 91—this is the time of storage of the message in store 41;
- RX Count 92—this is the number of times copies of the same message have been received by the device;
- TX Count 93—this is the number of times the message has been sent on;

Dead Flag 94—this flag is set when the message is no longer to be propagated, the message having become inactive for this purpose, for example, as a result of a propagation limit having been reached;

Keep Flag 95—this flag is set in response to the user indicating that he/she wants the message to be kept;

Delete Flag 96—this flag is set when the user indicates no more interest in a message.

Message store is responsible for periodically running garbage collection process 48 to remove message entries no longer required either by the user or for onward propagation. With respect to the PM message receipt handler 46, whenever a message is received that has a class of PM (or PO if the user has elected to treat such messages as PM messages) then one of two things happens depending on whether or not the user has elected to reject all PM messages. If the user has elected to reject all PM messages, the handler 46 is not called and the message is simply discarded; however, if the use has elected to receive PM messages, the handler is triggered 46. Operation of handler 46 will now be described with reference to FIG. 4.

Figure 4:
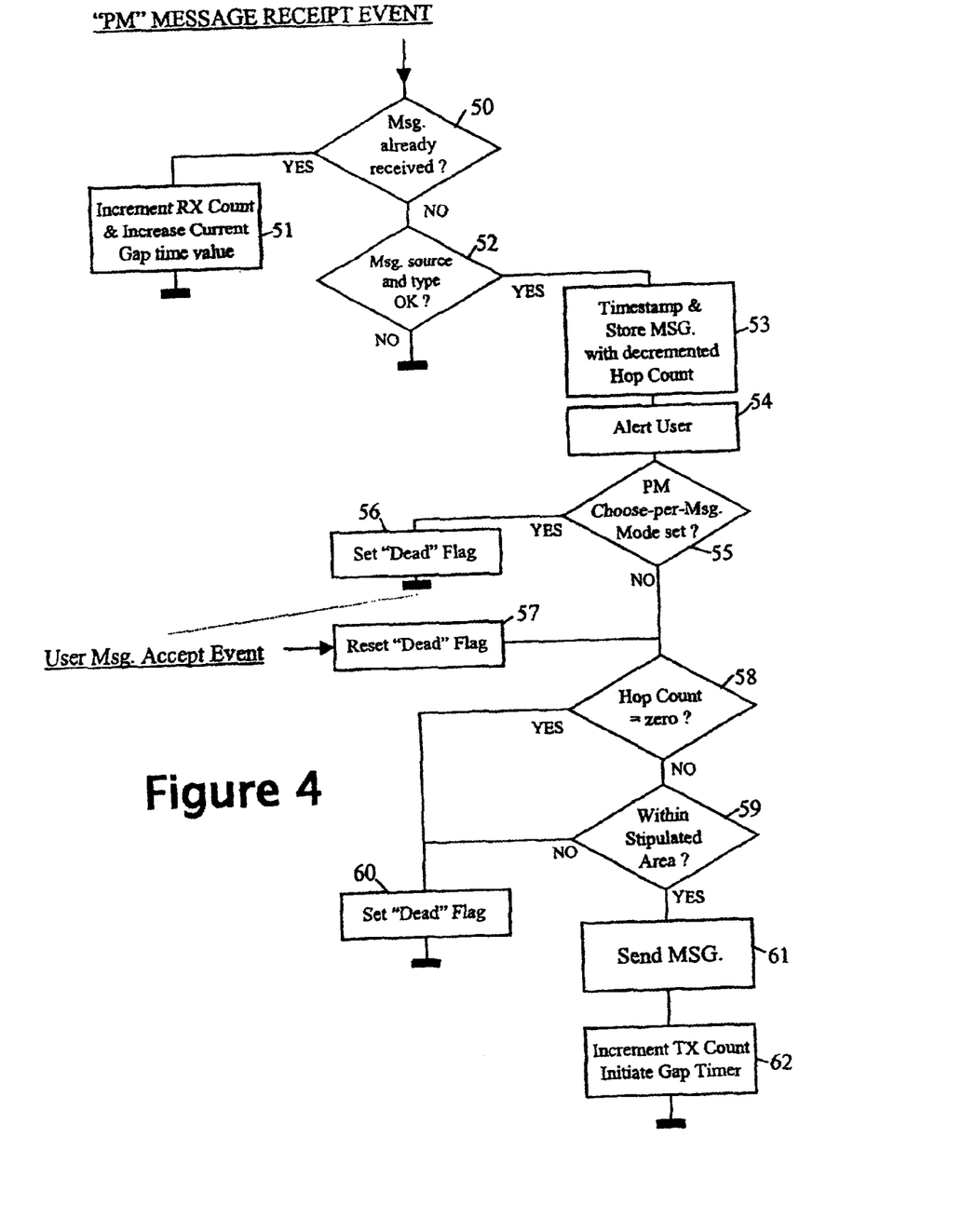
FIG. 4 is a diagram depicting the operations carried out by the FIG. 3 device upon first receipt of a message.
Figure 5:
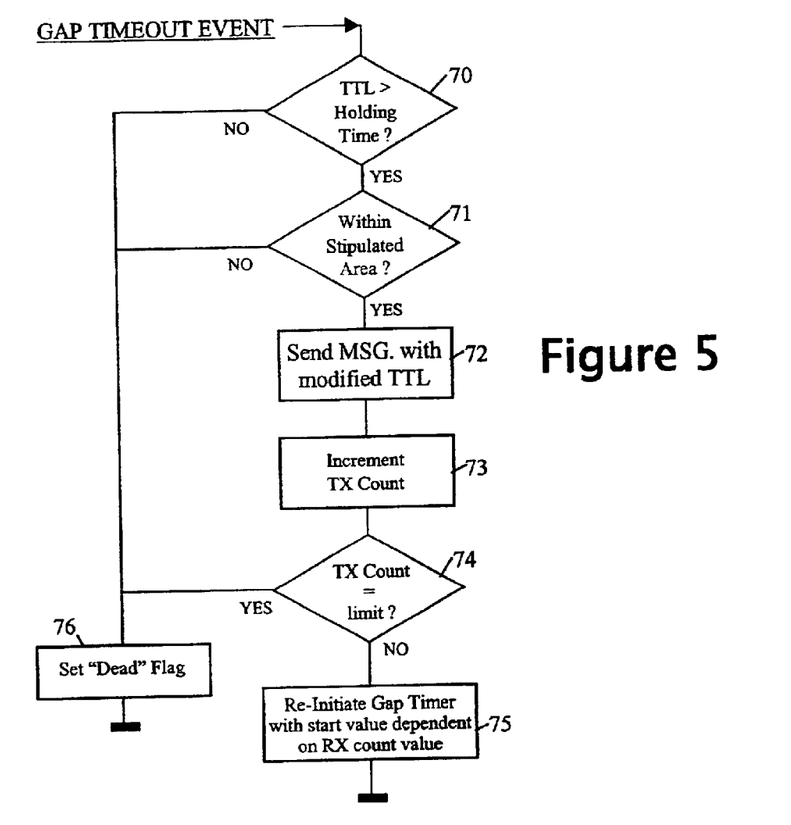
FIG. 5 is a diagram depicting the operations carried out by the FIG. 3 device upon timeout of a sending interval.

Handler 46 first checks the message ID in message field 22 to ascertain by comparison with the IDs of messages already held, whether the new message has already been received (see block 50)—if this is the case, then the RX Count 92 for the copy of the message already stored is incremented and the gap time value currently being timed for the message is increased (see block 51). If the just-received message has not been received before, the message source and information type fields 23 and 24 are checked (see block 52) against the user-specified acceptable values of these parameters held in store 44; if either or both fields contain unacceptable values, the message is discarded, otherwise it is time-stamped and stored in a new message entry 49 in store 41 and its hop count field 27 is decremented (see block 53). The flags 94 to 96 of the new message entry 49 are all initially in a reset state and the TX and RX counts are zero.

The user is now alerted, using alert device 36, to the receipt of the new message (see block 54).

What happens next depends on whether the user has generically elected that all PM messages (including PO messages treated as PM messages) are accepted for propagation, or whether such election is to be effected on a message-by-message basis (see block 55). In the former case, processing continues at block 58 whereas in the latter case, the Dead flag 94 for the message is "set" and the handler terminates its operation pending a message accept event which, if received, causes resetting of the Dead Flag (see block 57) before resuming processing at block 58.

The operation of the device is such that it only permits a user to view a PM message if the message is accepted for propagation. The interruption of event-handler processing between blocks 56 and 57 is to ascertain whether the user is willing to accept the message for propagation so permitting it to be accessed by the user. After processing is discontinued at block 56, user interface control 42 causes indications about the message to be displayed (or otherwise presented to the user) so as to enable the user to make an informed choice about whether to accept the message. If the user elects to discard the message by selecting delete from an option menu or if he user simply ignores the message, it will in due course be removed from store 41 by the garbage collection process 48 without having been made available for access by the user and without having been propagated. On the other hand, if the user accepts the message for propagation, the user is enabled to access the full message and the message is accepted for propagation—in this case, processing is resumed at block 47 as already indicated. Interface control 42 keeps track of whether a message has been accepted for propagation, and is therefore to be fully accessible, by storing an ID list of messages not yet accepted; alternatively, and extra flag in message entry 49 can be used for this purpose.

Where a user has elected generically to accept PM messages, then no user intervention is required and the message is automatically accepted for propagation and is accessible to the user; there is thus no need to store an indication of which messages have yet to be accepted.

Continuing on the description of the operation of event handler 46 at block 58, this and the following blocks are concerned with effecting a first onward propagation of the message. Whilst this initial sending is not subject to a time-to-live check, both a hop count check (see block 58) and locale check (see block 59) are carried out. If both checks are passed, the message is sent on (see block 61) through transmit block 32; thereafter, TX Count 93 is incremented and gap timer 45 is triggered to start timing an inter-sending gap the initial duration of which is preset. If either of the checks carried out in blocks 58 and 59 fails, the "Dead" Flag 94 is set (see block 60) and no further attempts are made to propagate the message.

With respect to the locale check carried out in block 59, this involves comparing the locale specified in the location filed 28 with the current device location as determined by the location discovery unit 33. One way of implementing this comparison simply is to have the field 28 include cellular radio cell IDs that are valid (that is, within which the message can be propagated) and arrange for the discovery unit (a cellular radio device) 33 to extract current cell ID information from signals receive over the cellular network.

Considering next the gap timeout event handler 47 (see FIG. 5), when this handler is triggered by a sending-gap timeout generated by unit 45 in respect of a particular message, the handler 47 determines whether it is appropriate to send out the message again. More particularly, the handler first checks (see block 70) whether the current duration of the holding time of the message in the device (current internal clock time less timestamp) is greater than the time-to-live value held in message field 26. If this is the case, then the message has exceeded its lifespan and its associated Dead flag 94 is set (see block 76); no further propagation of the message is effected. However, if the message holding time is less than the time-to-live value, a location check is done (see block 71) in the manner already described with respect to block 59. Again, if this check fails the Dead flag is set and no further sending is effected. However, if the location check is passed, the message is re-sent but only after the value held in its time-to-live field 26 is reduced by the holding time of the message in the device (this reduction is effected only for the sent copy of the message, not the stored copy). Next, the TX Count for the message is incremented (see block 73) after which a check is made against a predetermined limit stored in device 10 (see block 74). If the TX Count value equals (or is greater than) the limit value, the message has been sent the maximum number of times permitted by the device and its Dead flag is set. If the limit has not yet been reached, the gap timer 45 is triggered again to start the timing of a new inter-sending gap for the message. It may be noted that it is not whether the Dead Flag has been set which controls whether or not a message is re-sent but, rather, whether the gap timer is re-triggered and, if so, whether the subsequent checks carried out in blocks 70 and 71 are passed.

The purpose of the three flags Dead, Keep and Delete (respectively flags 94, 95 and 96) is to control whether or not a message entry can be deleted form the store 41 by the garbage collection process 48. In this respect, a user may decide he/she wishes to keep a message (by using the user interface 34 to set the Keep flag 95) notwithstanding that the message is "dead" in relation to the propagation process; however, a message that is not dead should not be deleted. A complication also arises in that a message may die immediately after having been received and before the user has had a realistic chance to access it. All messages need to be given a reasonable opportunity to be accessed by the user before removal; on the other hand, non-accessed messages cannot be stored for long periods particularly in areas where many different messages are being received. A compromise is to allow non-accessed messages that are dead to be held for up to ten minutes before removal from the store; if the user intervenes before the ten minutes has elapsed, then the Keep or Delete flags will be set in which case these flags will determine whether or not the dead message is removed.

Figure 6:
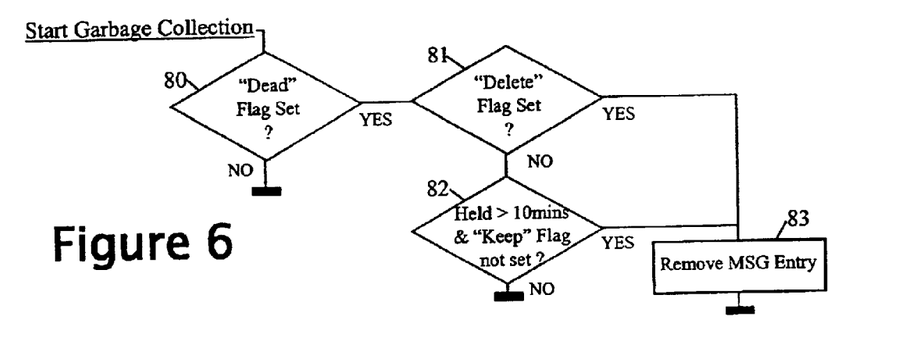
FIG. 6 is a diagram depicting the operations carried out by the FIG. 3 device for removing old, unwanted, messages from a message store of the device.

FIG. 6 depicts the garbage collection process 48. First the Dead Flag of a message is checked (see block 80)—if this flag is not set the message is retained. If the Dead flag is set, the Delete flag is next checked (see block 82)—if this flag is set the message entry is removed (see block 83). If the Delete flag is not set, the message holding time is checked together with the status of the Keep flag (see block 82)—if the message has been held for more than ten minutes, then it is removed unless the Keep flag is set.

Rather than the fixed ten minute threshold discussed above, this threshold could be made adaptive according to the amount of free memory space in store 41.

Variants

Many variants are possible to the above-described embodiment of the invention as will be appreciated by persons skilled in the art.

Figure 7A:
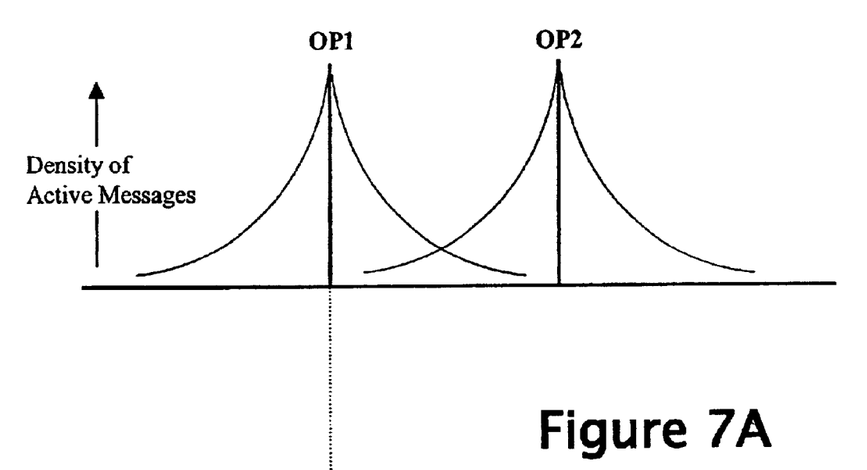
FIG. 7A is a diagram illustrating the variation of live message density around two originating points.

FIG. 7 illustrates one variant for judging location. More particularly, FIG. 7A depicts the density of "live" or active messages around two originating points OP1 and OP2 respectively, as considered over a time window (or a set of the N most recently received messages). The Figure shows separately the density variation for messages from each of the two originating points (the density of live messages from OP1 being highest at OP1 and then dropping away with distance, and the messages from OP2 exhibiting a similar density variation).

Figure 7B:
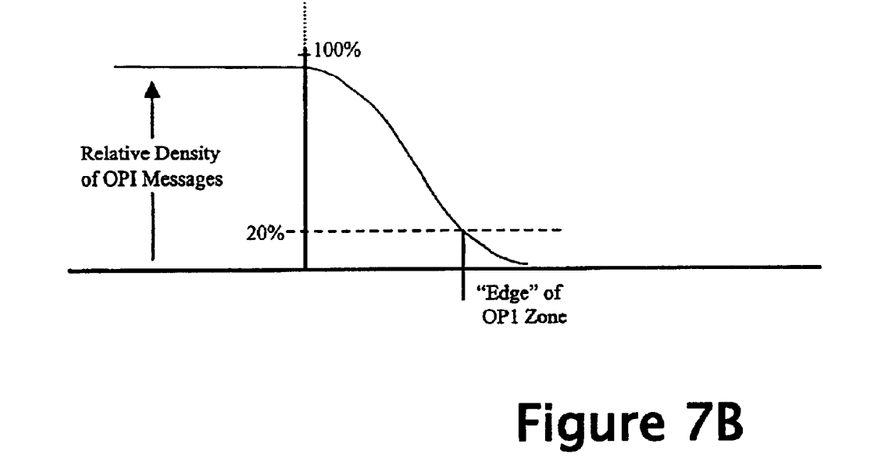
FIG. 7B is a diagram illustrating the percentage of messages likely to be received from one of the FIG. 7A originating points by a device moving past that point.

As would be expected, if a device moves from near OP1 towards OP2, the device will receive an increasing number of messages from OP2. FIG. 7B depicts the percentage of messages being received by the device from OP1 as the device is moved between OP1 and OP2.

By looking at this percentage, the device can decide whether it is "nearer" to OP1 than OP2, though this judgement will not necessarily correspond to one made on the basis of real physical distances. If the device is concerned to know its location and if originating-point location information is contained in at least some of the messages from each originating point, the device which is receiving messages propagated from both originating points can decide to which originating point it is closest and therefore which originating-point location best represents the device's own location. With more originating points, the test as to which is the closest originating point becomes which originating point is presenting the most messages to the device within a specified time window.

The curve of FIG. 7B can also be used to determine a boundary to the zone of influence of OP1 with this boundary then being used as a limit beyond which message propagation in respect of OP1 originating messages should cease in order to avoid excessive message diffusion. In the present example, the boundary is defined as where the received messages coming from OP1 falls to 20% of the total received messages. A boundary set in this manner has the advantage that it does not require the inclusion of locale limit data in each message.

Another variant concerns the method used to limit propagation based on setting a limit to the message life. In the system and device described above, a message time-to-live value in message field 28 is decremented as the message is propagated through the devices until the value reached zero—in effect, the message lifetime was specified by the originating point. An alternative is to use the field 28 as a message-age field that is initially zero when the message is sent out by the originating point but which is incremented by each propagating device by an amount corresponding to the time the message spends in the device before being sent on. Each receiving device then decides whether the message has become too old to be worthy of sending on, the message age being the value in field 28 of the received message plus the time spent by the message in the device before its intended propagation. Each device can have a different message age threshold which can be user set.

Furthermore, in the above described embodiment, the receiving device checks immediately prior to the device's intended propagation of the message whether the message-life threshold has been exceeded; it is necessary to wait to this moment because the sending gap is variable and therefore a send time, and thus the remaining-life/age of the message cannot be predicted in advance. However, in cases where the device is arranged to schedule message propagation in advance in a way that enables it to know fairly accurately when the message is likely to be sent, the device can at the same time check whether the message-life threshold of the message will have been exceeded at the time the message is scheduled to be sent—if the threshold will have been exceeded then the message is not scheduled for sending.

Generally with respect to the defining parameters of the various propagation limiting techniques described above, the values of these parameters can be made dependent on the message characteristics (message class/message source/information type); in this way, the propagation of, for example, advertising messages can be more restricted that that of other message types.

As regards the application of user-specified message filters (step 52, FIG. 4), different filters can be applied to message viewing and message propagation. Also the time a message is retained in memory for propagation purposes can be made different from the time the same message is retained for the purposes of viewing purposes.

A useful behaviour, at least in some circumstances, is to arrange for a device that is holding one or more messages for onward transmission, to send these messages immediately after having received a message (or messages) from another device, there being a high probability that the latter device will receive the transmitted messages. The transmission of a message in this way will, of course, result in the updating of the message transmission count (indeed, the count may be incremented by more than one to reflect the high probability of message receipt).

What is claimed is:

1. A method of locally diffusing information for presentation to users of mobile devices, the method involving propagating the information from an originating point in messages passed from mobile device to mobile device by non-wired short-range communication means of the mobile devices, presentation of a first message, which is received at a first one of the mobile devices, being inhibited to a user of the first mobile device unless the first mobile device is enabled to propagate on the first message.

2. A method according to claim 1, wherein propagation enablement of the first mobile device is pre-specified by the user for at least a subset of the messages.

3. A method according to claim 1, wherein propagation enablement of the first mobile device is effected on a per message basis, the user being presented with a brief indication about the first message and being given the choice whether or not to access the first message in full, choosing to do so enabling the first mobile device for propagation of the first message.

4. A method according to claim 1, wherein the first mobile device, when enabled to propagate a particular one of the messages, does so without regard to any message life limit set on the particular message.

5. A method according to claim 1, wherein each message includes a message class indicator indicating whether the message is one that requires a mobile device to be enabled for propagation of the message before the message can be presented to the mobile device user.

6. A mobile device for locally diffusing information in messages to other mobile devices for presentation to their users, the mobile device comprising:
  a message store;
  a short-range wireless transceiver for receiving messages and storing them to said store, and for transmitting messages retrieved from the store;
  a user interface for presenting received messages to a user; and
  a controller for controlling onward transmission of received messages and operative, at least in respect of certain received messages, to inhibit presentation of a received message to the user unless the mobile device is enabled to transmit on the received message.

7. A mobile device according to claim 6, wherein the controller is pre-configured by the user to enable onward transmission for at least a subset of the messages received by the mobile device.

8. A mobile device according to claim 6, wherein the controller and user interface are arranged to permit the user to indicate to the controller, on a per message basis, that a particular message which would not otherwise be presented to the user by the controller, can be transmitted on; the controller being arranged to respond to such an indication by permitting presentation of the message to the user.

9. A mobile device according to claim 8, wherein the controller is operative to present to the user, via the user interface, a brief indication about said particular message in advance of the user having indicated whether onward transmission of the message is to be enabled, whereby to enable the user to make an informed choice regarding onward transmission.

10. A mobile device according to claim 6, wherein the mobile device is arranged, when enabled to propagate a message, to do so without regard to any message life limit set on the message.

11. A mobile device according to claim 6, wherein each message includes a message class indicator indicating whether the message is one that requires the mobile device to be enabled for propagation of the message before the message can be presented to the user, the device controller being operative to check this indication to determine whether message propagation enablement is a requirement for presenting the message to the user.

12. The mobile device according to claim 6, wherein the controller controls the onward transmission of a message without a particular structure.

13. The method according to claim 1, wherein the propagation of the messages passes from mobile device to mobile device without any particular routing structure.

* * * * *